May 16, 1939.  F. ROBINSON  2,158,833

STUFFING BOX

Filed Dec. 16, 1937

Inventor
FORSTER ROBINSON
By Beaman & Langford
Attorney

Patented May 16, 1939

2,158,833

UNITED STATES PATENT OFFICE 2,158,833

STUFFING BOX

Forster Robinson, Lima, Ohio

Application December 16, 1937, Serial No. 180,061

8 Claims. (Cl. 286—26)

This invention relates to stuffing boxes, and more particularly to a stuffing box having a removable or replaceable packing.

Heretofore stuffing boxes for the most part have been of the type wherein the packing is axially compressed in order that the packing may be radially compressed against the rod passing therethrough. Not only is the radial compressing force inefficiently applied, but also the axial compression results in a physical damage to the packing, which shortens its life and thus requires frequent attention and replacement. The present invention is based on the theory that since a radial compression of the packing is what is ultimately desired, the radial compression should be applied directly rather than indirectly.

Accordingly, an object of the invention is to provide a stuffing box having a packing, against which a radial force is directly applied.

Another object of the invention is to provide a stuffing box wherein split resilient rings are clamped about the packing to radially and resiliently clamp the same against the rod passing therethrough.

A still further object of the invention is to utilize the pressure behind the packing for radially forcing the same against the rod passing therethrough.

These and other objects will be apparent from the following specifications when taken with the accompanying drawing, in which.

Figure 4:
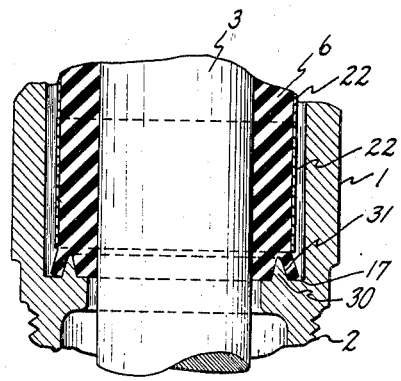
Fig. 4 is a partial vertical section of an embodiment of the invention.
Figure 3:
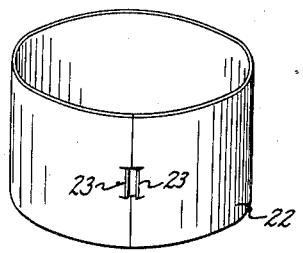
Fig. 3 is a perspective view of a clamping spring.
Figure 2:
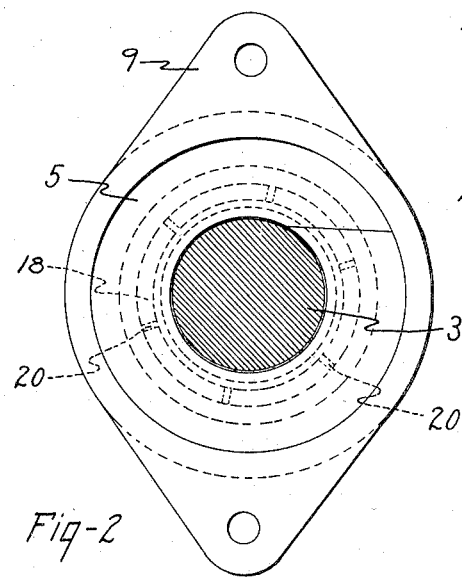
Fig. 2 is a plan view thereof, with the top plate or gland removed.

The disclosed embodiments of the invention are for use particularly in connection with oil well pumps. However, it is to be understood that the invention is of much broader application.

Referring particularly to the drawing, the reference character 1 indicates a stuffing box casing having a threaded portion 2 for connecting the casing to the top of the usual oil well tubing. Passing through the casing 1 is the usual polish rod 3, which reciprocates vertically through the casing 1 as the oil pump is actuated.

Projecting inwardly from the inner wall of the casing 1, slightly spaced from the top thereof is a seat 4 annular in configuration. Resting on the seat 4 is an annular flange 5 comprising an integral part of the split packing 6. The packing 6 preferably is composed of rubber. Telescoped into the top of the casing 1 is a gland 7 having flanges 8 drawn up against flanges 9 on the casing 1, by bolts 10.

The gland 7 is provided with an annular ring 15, which with the gland 7 defines a recess 16. When the flanges 8 are drawn against the flanges 9 by the bolts 10, the annular ring 15 clamps the annular flange 5 of the packing 6 against the seat 4. The depth of the recess 16 is preferably such that when the flanges 8 are drawn against the flanges 9 by the bolts 10, and the annular flange 5 of the packing 6 is fully clamped against the seat 4, the top of the central portion of the annular flange 5 just touches the top of the recess 16 without compressing the packing 6 in an axial direction.

At the lower portion of the casing 1 is an inwardly extending shoulder 17. Disposed on the shoulder 17 and projecting upwardly therefrom is an upwardly converging ridge 18 which is disposed in an annular recess 19 in the lower end of the packing 6. Thus the ridge 18 and the recess 19 provide a lateral and axial support for the packing 6.

The ridge is provided with a plurality of vertical slots 20. The slots 20 provide a communication between the lower portion of the casing 1 to the annular chamber 21 defined by the side wall of the casing 1 and the packing 6. Thus a fluid pressure is admitted to the chamber 21 which acts radially against the rod 3.

Disposed about the packing 6 are a plurality of split spring clips 22 for the purpose of exerting a radial force against the packing 6, and thus urging the same against the rod 3. As shown particularly in Fig. 4, the spring clips 22 have provided at each side of the splits thereof projections 23 for the purpose of providing engagement portions against which a bearing may be had to spring open the clips when the same are to be placed about the packing 6.

From the foregoing description it will be seen that a seal between the packing 6 and the casing 1 is provided by the gland 7 clamping the annular flange 5 of the packing 6 against the seat 4, and that a seal between the packing 6 and the rod 3 is provided by the spring clips 22 exerting a radial force against the outside of the packing 6 to urge the same against the rod 3. The force exerted by the spring clips 22 is augmented by the fluid pressure in the chamber 21.

Figure 1:
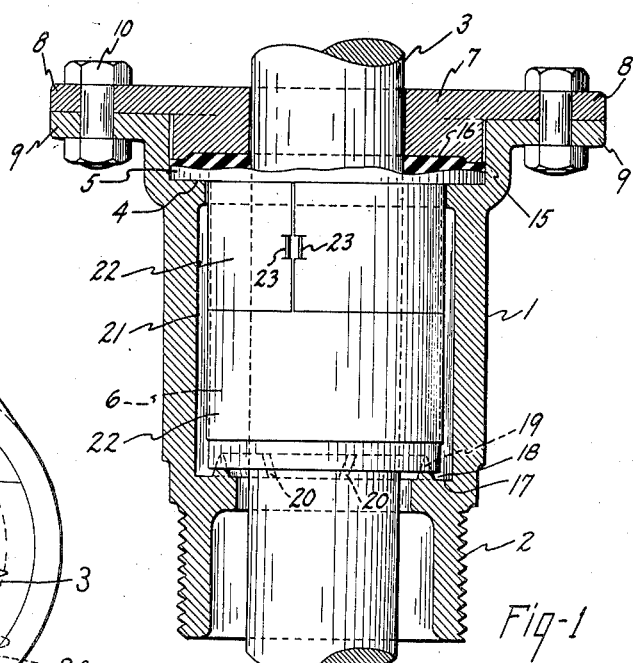
Fig. 1 is a vertical section of the invention.

An embodiment of the invention is disclosed in Fig. 4. The shoulder 17 in the lower portion of the casing 1 is provided with an upstanding converging ridge 30 which seats in a complementary recess 31 in the lower end of the packing 6. In this modification of the invention the packing 6 is disposed down against the shoulder 17 so that a fluid seal is provided. This seal is in addition to the seal provided by the annular flange 5 being clamped against the shoulder 4 on the upper part of the casing 1. It will be observed that the ridge 30 does not have slots 20, as does the ridge 18 disclosed in the embodiment of Fig. 1.

It will be understood that the above described embodiments are merely examples of forms which my invention may take. For instance, if desired, the ridge on the lower shoulder 17 or the lower shoulder 17 and its ridge, for sealing and supporting may be entirely dispensed with. If preferred, one or more than two resilient spring clips 22 may be employed. Also, some other construction might be used for providing a seal between the casing 1 and the packing 6. While the present invention is disclosed as applied to the top of a well tubing, it will be clear that it may be used wherever a seal is desired between a member and a moving rod. As an example, it could be used to provide the seal between the cylinder and piston rod in a steam engine.

Having thus described my invention, what I wish to secure by Letters Patent and claim is:

1. A stuffing box for association with a rod, for preventing the passage of pressure fluid between the box and the rod, comprising a casing, a continuous radially projecting shoulder therein, a split packing having a body and a peripheral radially projecting shoulder thereon adjacent one end thereof, said casing and packing having an annular space therebetween, means to clamp said packing shoulder against said casing shoulder, and means projecting from said casing, opposite said casing shoulder to support the end of said packing body opposite said casing shoulder, said box having ports communicating with said annular space for subjecting the same to said pressure fluid.

2. A stuffing box for association with a rod, comprising a casing, a continuous radially projecting shoulder therein, a split packing having a body and a peripheral radially projecting shoulder thereon adjacent one end thereof, said packing having in the end thereof away from said shoulder a recess, means to clamp said packing shoulder against said casing shoulder, a second shoulder within said casing below said first casing shoulder, and a ridge projecting upwardly from said second shoulder into said recess to support said away end of said packing.

3. A stuffing box for association with a rod, comprising a casing, a continuous radially projecting shoulder therein, a split packing having a body and a peripheral radially projecting shoulder thereon adjacent one end thereof, said packing having in the end thereof away from said shoulder a recess, means to clamp said packing shoulder against said casing shoulder, a second shoulder within said casing below said first casing shoulder, and a ridge projecting upwardly from said shoulder into said recess to support said away end of said packing, said casing and midportion of said packing between said casing shoulders defining an annular chamber, said ridge having passages therethrough.

4. A stuffing box for association with a rod, comprising a casing, a continuous radially projecting shoulder therein, a split packing having a body and a peripheral radially projecting shoulder thereon, and a gland for clamping said packing shoulder against said casing shoulder, said gland telescoping with said casing and having as the active portion thereof an annular ring, said annular ring defining with said gland a recess for receiving an end of said packing when said ring compresses said packing shoulder in clamping the same against said casing shoulder.

5. A stuffing box for association with a rod, comprising a casing, a continuous radially projecting shoulder therein, a split packing having a body and a peripheral radially projecting shoulder thereon, a gland for clamping said packing shoulder against said casing shoulder, said gland telescoping with said casing and having an annular ring as the active portion thereof, said annular ring defining with said gland a recess for receiving an end of said packing when said ring compresses said packing shoulder in clamping the same against said casing shoulder, and flanges on said casing and gland adapted to be clamped together for clamping said packing shoulder against said casing shoulder, the depth of said recess being such that it just contacts the top of said packing when said flanges are together.

6. A stuffing box for association with a rod for preventing the passage of pressure fluid between the box and the rod comprising a casing, a continuous radially projecting shoulder therein, a split packing having a body and a peripheral radially projecting shoulder thereon, a gland for clamping said packing shoulder against said casing shoulder, said gland telescoping with said casing and having an annular ring as the active portion thereof, said annular ring defining with said gland a recess for receiving an end of said packing when said ring compresses said packing shoulder in clamping the same against said casing shoulder, flanges on said casing and gland adapted to be clamped together for clamping said packing shoulder against said casing shoulder, the depth of said recess being such that it just contacts the top of said packing when said flanges are together, said packing body being spaced from the interior wall of said casing and defining with said wall an annular chamber, said packing having in the end thereof away from said shoulder an axially extending annular recess, a second annular radially projecting shoulder within said casing below said first shoulder, and an annular ridge projecting upwardly from said second shoulder into said recess to support said away end of said packing, said box having ports communicating with said annular chamber and subjecting the same to said pressure fluid.

7. A stuffing box for association with a rod, comprising a cylindrical casing, an annular radially projecting shoulder therein, an annular split packing having a body and a peripheral radially projecting shoulder thereon adjacent one end thereof, said packing having in the end thereof away from said shoulder an axially extending annular recess, means to clamp said packing shoulder against said casing shoulder, a second annular radially projecting shoulder within said casing below said first shoulder, an annular ridge projecting upwardly from said second shoulder into said recess, and means to radially clamp the packing against the rod passing therethrough.

8. A stuffing box for association with a rod, for preventing the passage of pressure fluid between the box and the rod comprising a casing, a packing within said casing, means for providing a seal between said packing and said casing, said casing and packing having therebetween an annular space, said packing having in the end thereof away from said sealing means a recess, a shoulder within said casing below said sealing means, and a ridge projecting upwardly from said shoulder into said recess, to support said away end of said packing, said box having ports communicating with said annular space for subjecting the same to said pressure fluid.

FORSTER ROBINSON.